United States Patent
Arakawa

(10) Patent No.: US 7,952,750 B2
(45) Date of Patent: May 31, 2011

(54) IMAGE PROCESSING APPARATUS AND IMAGE PROCESSING METHOD

(75) Inventor: Junya Arakawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 654 days.

(21) Appl. No.: 11/950,237

(22) Filed: Dec. 4, 2007

(65) Prior Publication Data

US 2008/0151274 A1   Jun. 26, 2008

(30) Foreign Application Priority Data

Dec. 22, 2006   (JP) ................................. 2006-346196

(51) Int. Cl.
  *G06K 15/00* (2006.01)
  *G06K 9/00* (2006.01)
  *G06K 9/46* (2006.01)
  *H04N 1/40* (2006.01)

(52) U.S. Cl. ......... 358/1.8; 358/3.28; 358/1.9; 382/100; 382/232

(58) Field of Classification Search .................. 358/3.28, 358/1.9, 1.8; 382/100, 232; 380/51, 54, 380/201, 210, 252, 287; 370/522–529; 283/72, 283/74–81, 93, 113, 901, 902; 348/461, 348/463; 345/744

See application file for complete search history.

(56) References Cited

U.S. PATENT DOCUMENTS

| 5,568,550 | A | 10/1996 | Ur | |
|---|---|---|---|---|
| 6,577,760 | B1 | 6/2003 | Ohta et al. | |
| 7,643,651 | B2 * | 1/2010 | Asai | .............................. 382/100 |
| 2002/0033844 | A1 * | 3/2002 | Levy et al. | .................... 345/744 |

FOREIGN PATENT DOCUMENTS

| CN | 1441593 A | 9/2003 |
|---|---|---|
| CN | 1495671 A | 5/2004 |
| EP | 921675 | 6/1999 |
| GB | 2325765 | 12/1998 |
| JP | 2003-094734 A | 4/2003 |
| WO | WO01/71960 | 9/2001 |

* cited by examiner

*Primary Examiner* — Charlotte M Baker

(74) *Attorney, Agent, or Firm* — Canon USA Inc. IP Division

(57) ABSTRACT

There is provided an image processing apparatus configured to generate code information represented by a dot array and attach the code information on an image. The image processing apparatus includes a determination unit configured to determine one pattern from among a plurality of patterns wherein locations to attach the code information differ from each other, and an attaching unit configured to attach the code information on a location corresponding to the pattern determined by the determination unit.

10 Claims, 14 Drawing Sheets

IMAGE PROCESSING APPARATUS AND IMAGE PROCESSING METHOD

BACKGROUND OF THE INVENTION

1. Field of the Invention

The present invention relates to an image processing apparatus and an image processing method for attaching information on an image to be printed.

2. Description of the Related Art

In recent years, an image processing method has been widely used, in which embedding information is converted into code information (coded information) that requires some decoding processing, and is printed on print media. Generally, the code information is embedded in two-dimensions on images, and referred to as two-dimensional code.

A user cannot recognize the printed code information without performing some processing. That is, the user can recognize the code information by reading the code information as image data using a reading device and performing appropriate decoding processing on the image data.

Typically, in the decoding processing, the read image data is transferred to a computer and decoded by an application program that runs on the computer. However, a method for decoding is not limited to the above one. For example, as in a case of two dimensional code compatible mobile phones, the decoding processing can be performed in the reading device, or the decoding processing can be performed in copying machines that have multiple functions.

The two-dimensional code is roughly categorized into high-density code information and low-density code information. The high-density code information is prepared independent of characters or patterns (print information) that are printed on paper and is embedded, for example, on four corners of the paper. For example, bar codes are used in the high-density code information.

On the other hand, the low-density code information is superimposed on the characters or patterns and printed, for example, over the entire paper.

The low-density code information is represented using a dot array, and the information amount that can be embedded in a predetermined area on paper is relatively small. However, the density of lines or dots representing the information can be reduced. As a primary advantage of attaching the low-density code information on the paper, it is not necessary to prepare a particular space for printing the code information.

On the other hand, in the case of the high-density code information, the density of the lines or dots for representing the information is higher. Therefore, if the code information is superimposed, the print information under the code information may be lost. Accordingly, to prevent the print information from being lost by attaching the code information, it is necessary to keep in advance a space where the code information is to be attached and attach the code information in the predetermined space.

On the other hand, generally, in the case of the low-density code information, even if the code information is attached, the legibility can be maintained although some information deteriorates, and the information can be possibly maintained. Accordingly, it is possible to superimpose the low-density code information on the print information without losing the print information. That is, design flexibility of print information is increased since there is no need for preparing a particular space for attaching the low-density code information. However, the low information density can be compensated for by using a large print area.

As a second advantage of attaching the low-density code information to paper, it is difficult to remove the code information. In the attaching method of this type, the print information and the code information are inseparably printed, and it is extremely difficult to remove only the code information and copy only the print information. Accordingly, for example, "print attributes" such as information about the printer that performed the printing, information about the user who did the printing or the print date and time, can be printed as the low-density code information on a print material. Therefore, even if the printed material is leaked to outside, the leakage route can be readily detected.

In a case where the code information is used for a security purpose, there is a problem in attaching information when a copy is made. When an original document on which print attributes are attached for security purposes is copied, it is necessary to further attach print attributes in the copying.

Japanese Patent Application Laid-Open No. 2003-094734 discusses a technique for providing in advance a space to which attaching information is added, and for storing information (write history information) for indicating its location. When the code information is attached, the write history information is read and a location for attaching the code is detected based on the read information. Then, the code information can be attached.

The above attaching method can be applied to high-density code information, but cannot be applied to the method for attaching low-density code information which is embedded over a large part of the paper. Because a large space on the paper is used for the first attaching of the low-density code information, it is difficult to provide a space for attaching the additional information. Moreover, even if the space for attaching the additional information is provided, the attaching part is separated from the code information attached in the first printing. Accordingly, the security level is lowered.

SUMMARY OF THE INVENTION

The present invention is directed to both attaching low-density code information on a large space of paper and attaching additional code information. Further, the present invention is directed to extracting the code information from an image on which the code information is attached.

According to an aspect of the present invention, an image processing apparatus configured to generate code information represented by a dot array and attach the code information on an image, the image processing apparatus includes, a determination unit configured to determine a location to attach code information based on mutually-different patterns of locations to attach the code information, and an attaching unit configured to attach the code information on the image at a location corresponding to the location determined by the determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EXEMPLARY EMBODIMENTS

Figure 1:
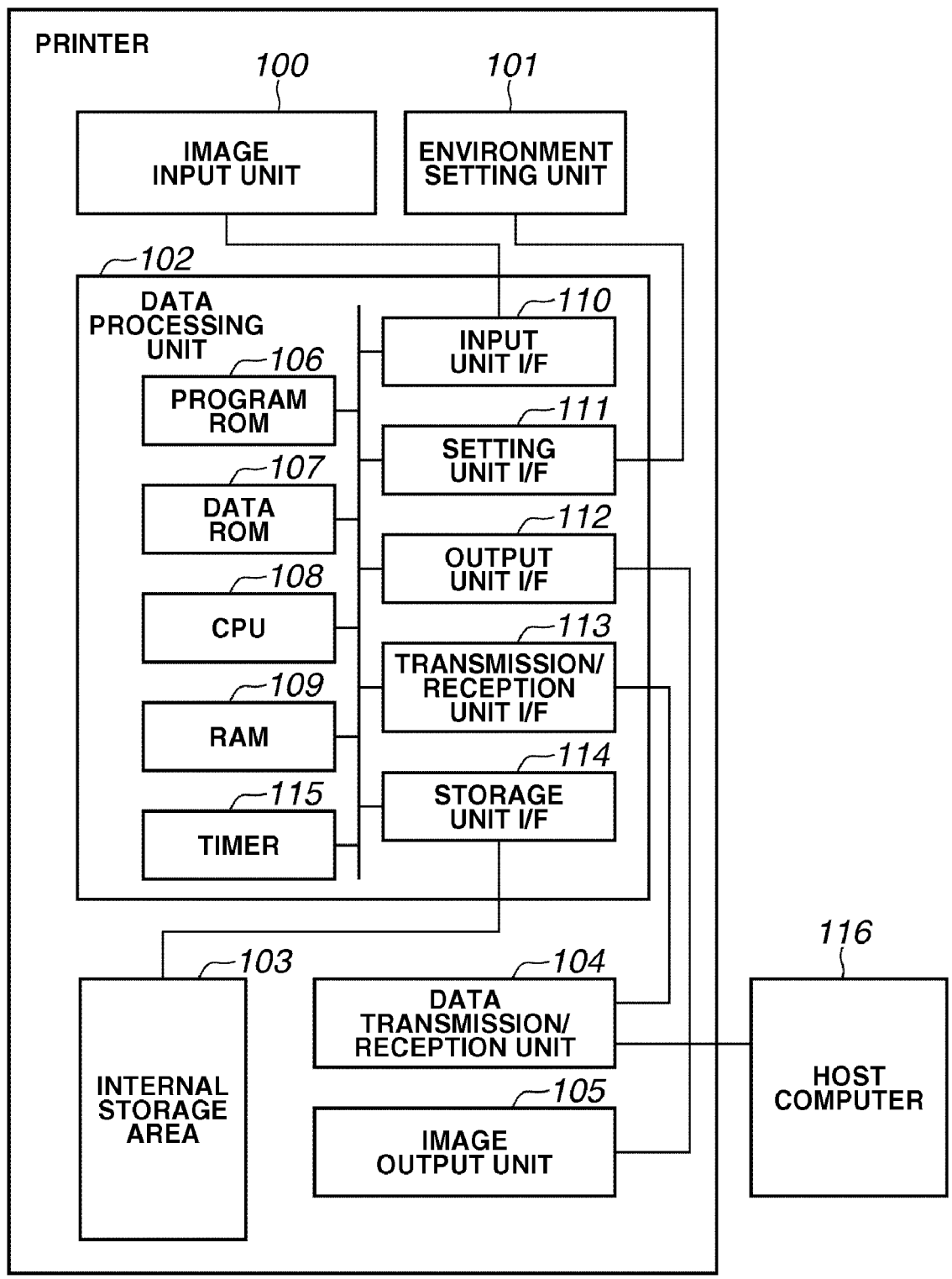
FIG. 1 is a view illustrating an image processing apparatus and a printing apparatus on which a code information attaching function is applied according to a first exemplary embodiment of the present invention.

Various exemplary embodiments, features, and aspects of the invention will be described in detail below with reference to the drawings.

First Exemplary Embodiment

In a first exemplary embodiment, a printing apparatus, more specifically, a copying machine that has a plurality of functions will be described.

A printing apparatus 1 includes an image input unit 100 such as a scanner, an environment setting unit 101 such as a user interface (UI) panel and a data processing unit 102 such as a video controller. The printing apparatus 1 further includes an internal storage area unit 103 such as a hard disk (HD), a data reception/transmission unit 104 such as a network interface (I/F) board or a facsimile and an image output unit 105 such as a printer.

In the first exemplary embodiment, the copying machine integrally includes a printer that is connected to a host computer 116, a copying machine provided with a scanner, a facsimile and the like. However, other types of apparatuses can also be used.

The data processing unit 102 includes an input unit I/F 110, a setting unit I/F 111, an output unit I/F 112, a transmission/reception unit I/F 113, and a storage unit I/F 114. The data processing unit 102 further includes a program read-only memory (ROM) 106 that stores a data processing/control program, a data ROM 107, a central processing unit (CPU) 108, a random access memory (RAM) 109 that is an internal storage area, and a timer (clock function) 115. These processing units are connected with each other via an internal bus.

Image data is read into the data processing unit 102 by scanning an input image using the image input unit 100 or by receiving image data transmitted from an external facsimile or a network through the data transmission/reception unit 104.

The image data read into the data processing unit 102 is processed based on an operating environment set in the image input unit 100 or information about operating environment included in the image data transmitted from outside. Then, in a case where the processed image data is printed in the printing apparatus, the data is transmitted to the image output unit 105. In a case where the image data is transmitted as print data to an external network, the data is transmitted to the data transmission/reception unit 104 and in a case where the image data is stored in the printing apparatus, the data is transmitted to the internal storage area unit 103, respectively.

If the image data is processed in the data processing unit 102, information in the data ROM 107 or the like is referred to if necessary. Further, based on operating environment that is notified via the setting unit I/F 111, a program is read out from the program ROM 106 and image processing is executed using the RAM 109 or the internal storage area unit 103.

Figure 2:
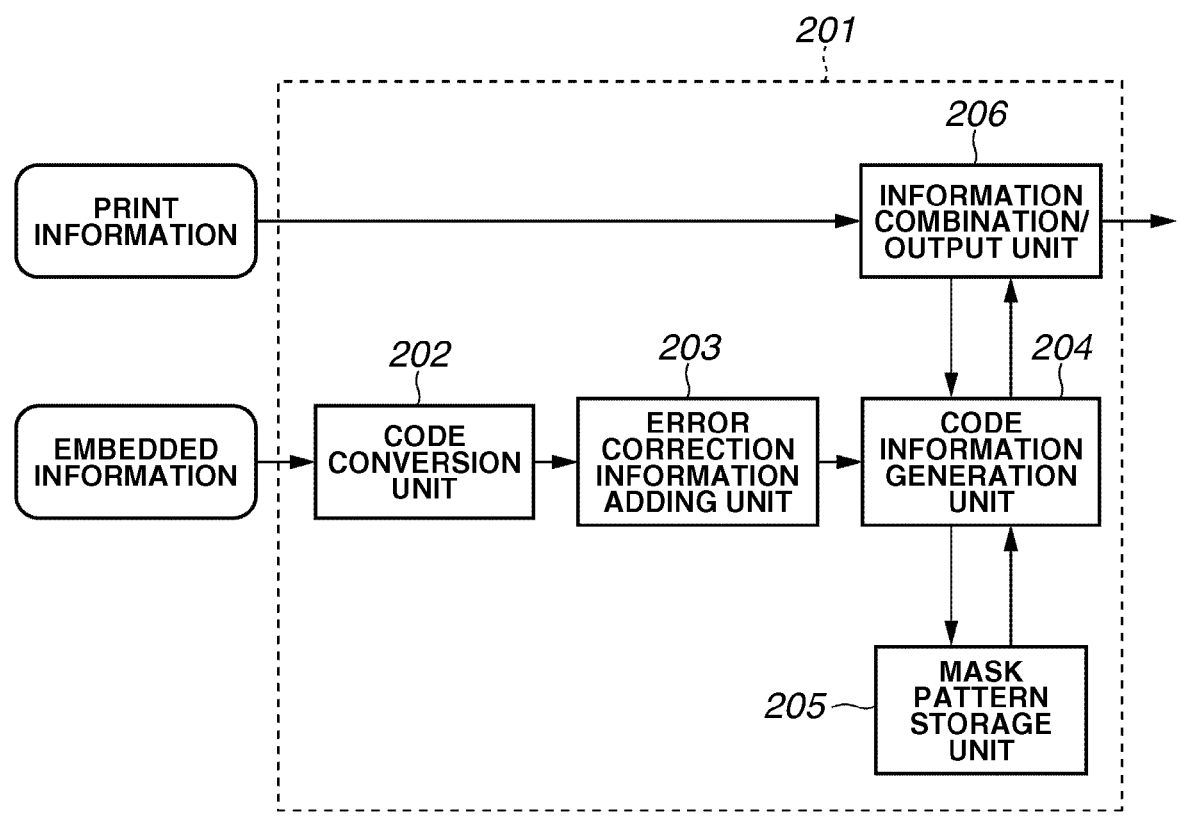
FIG. 2 is a block diagram illustrating the code information attaching function according to the first exemplary embodiment of the present invention.

FIG. 2 is a block diagram illustrating a code information attaching function according to the first exemplary embodiment of the present invention.

A code information control unit 201 controls generation of code information. A code conversion unit 202 converts inputted embedding information. An error correction information attaching unit 203 adds error correction information to the embedding information that is code-converted in the code conversion unit 202. A code information generation unit 204 generates code information from the embedding information to which the error correction information is added in the error correction information attaching unit 203. A mask pattern storage unit 205 stores a mask pattern that indicates a location on paper where the code information is arranged. A combination/output unit 206 combines the print information input into the code information control unit 201 and the code information generated in the code information generation unit 204.

Now, a processing flow of the code information attaching function according to the first exemplary embodiment will be described below with reference to FIG. 3.

In step S301, the code information control unit 201 acquires print information. The print information is acquired by scanning an image using the image input unit 100 such as a scanner or by receiving print data transmitted from an external host computer, an external facsimile or a network through the data transmission/reception unit 104.

In step S302, the code information control unit 201 acquires embedding information which is to be converted into low-density code information. A user or an administrator of the printing apparatus specifies the embedding information through a UI panel on the printing apparatus, or a dedicated application or printer driver running on a computer connected to the printing apparatus. The user can directly input the embedding information such as characters. Alternatively, the user can specify an address of data, from which the application or the printing apparatus can download the data. Moreover, the user can specify meta-information such as a user ID, date and time or a print job ID as the embedding information. In such a case, if an information amount to be attached is too large, tolerance with respect to the low-density code information is decreased and the quality of the print information is degraded. That is, the attaching density of the low-density code information is increased and essential information can be lost. Therefore, a user or an administrator cannot necessarily attach all the desired information. In such a case, an appropriate step has to be taken, for example, notification is sent to an UI (not illustrated). In the present exemplary embodiment, it is assumed that the attaching information does not exceed a predetermined information amount.

In step S303, the code information control unit 201 generates low-density code information. Detailed description of the processing will be described below.

In step S304, the combination/output unit 206 combines the code information generated in the code information generation unit 204 and the inputted print information. In first code information attaching, if the user or the administrator of the printing apparatus has specified a location through an application or printer driver running on the computer connected to the printing apparatus or through the UI panel provided in the printing apparatus, the code information is attached at the specified location. If no location is specified, the same code information can be repeatedly attached on the image. In the second and subsequent attachings, additional code information to be attached is superimposed on the code information generated in step S303.

In step S304, the combination/output unit 206 outputs the image on which the code information is attached.

The above-described flow is the processing of the low-density code information. An order of the flow can be changed depending on circumstances so that the flow does not become inconsistent.

Figure 3:
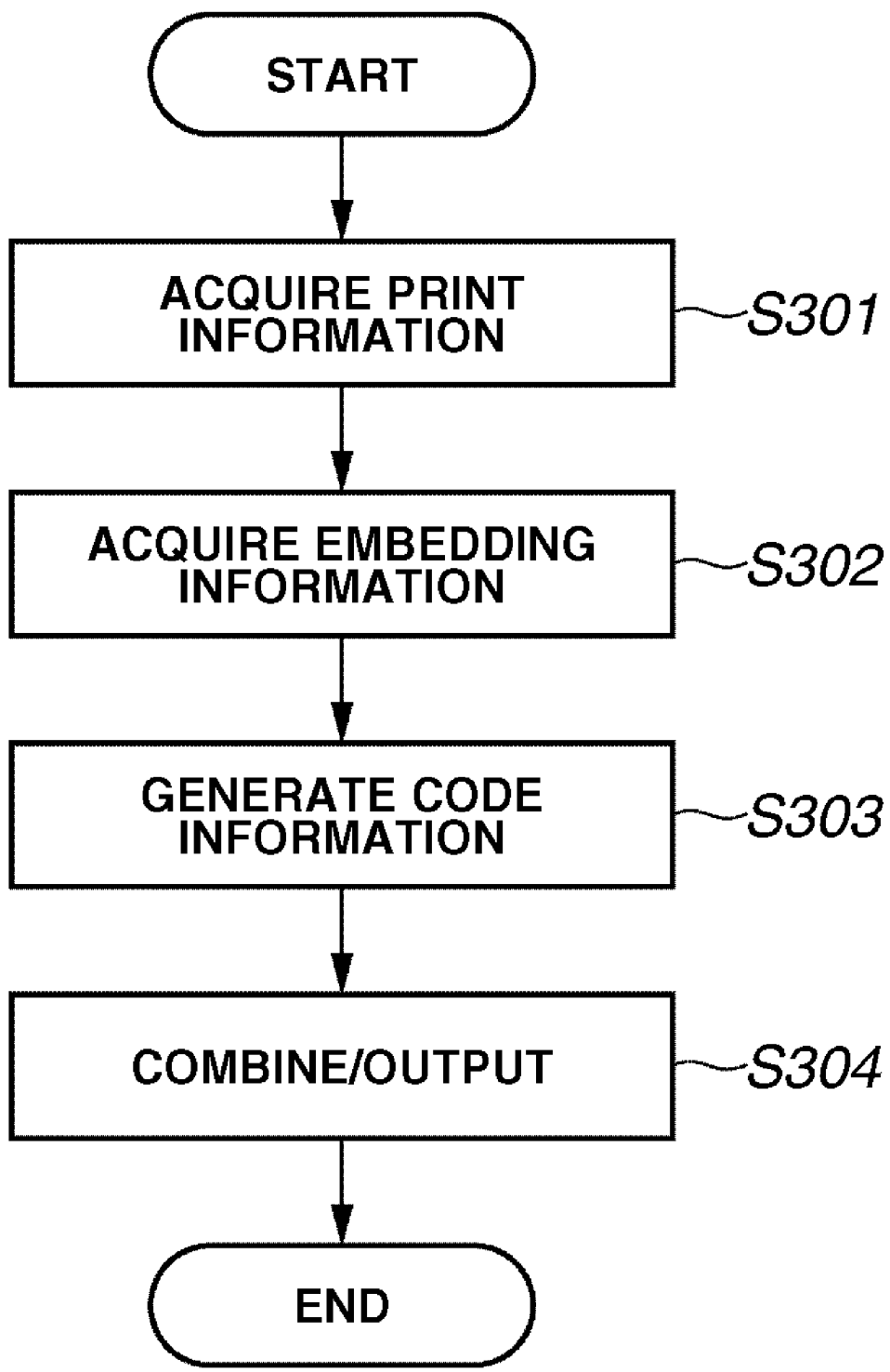
FIG. 3 is a flowchart illustrating the code information attaching function according to the first exemplary embodiment of the present invention.
Figure 4:
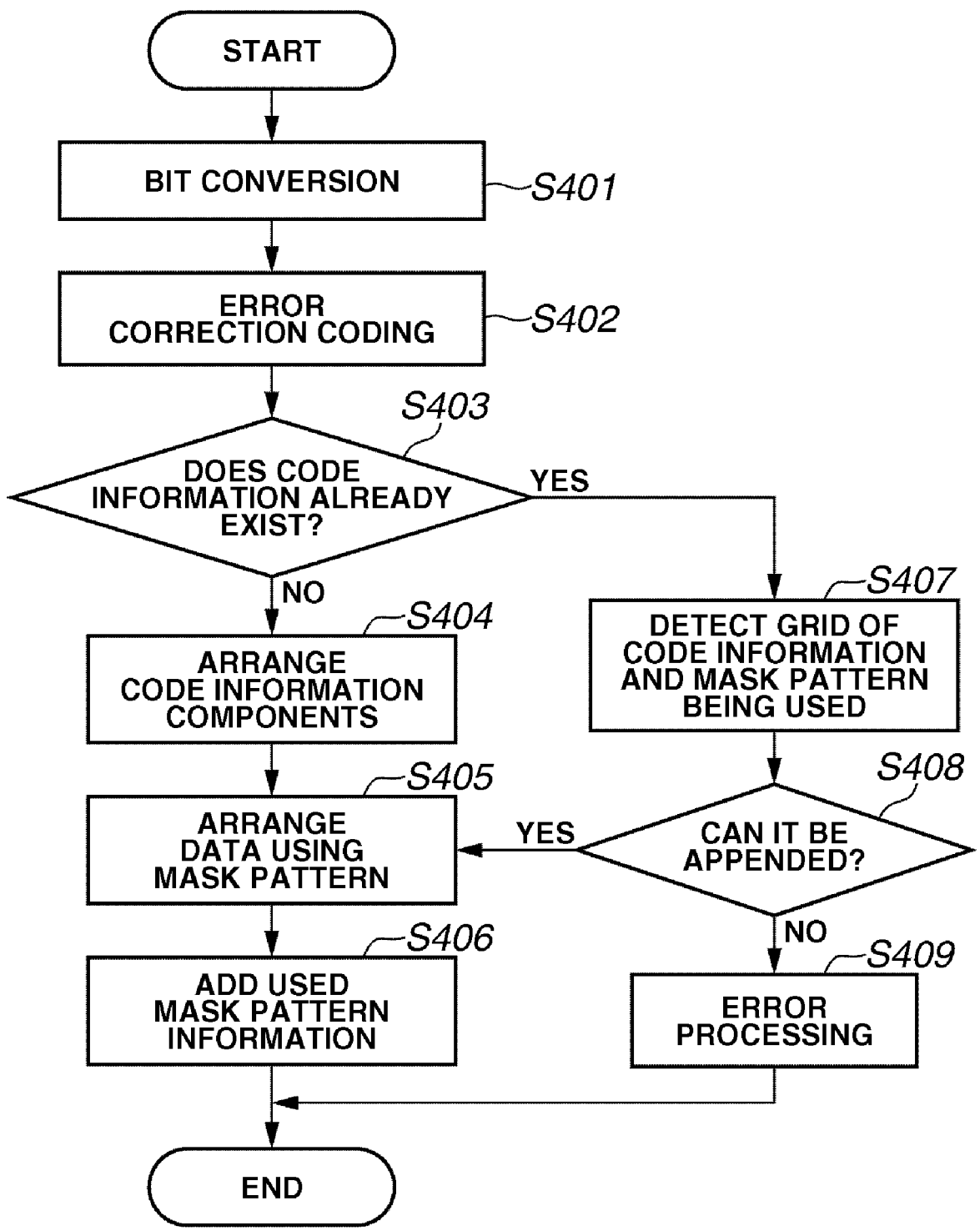
FIG. 4 is a flowchart illustrating the code information attaching function in detail according to the first exemplary embodiment of the present invention.

FIG. 4 illustrates a detailed processing flow of step S303 of FIG. 3.

In step S401, the code conversion unit 202 converts inputted embedding information into a predetermined bit array and attaches an indicator that shows a mode (numeric characters, alphanumeric characters, 8-bit bytes, kanji characters etc.) of the data or an end pattern if necessary. Further, the code conversion unit 202 converts the bit array into predetermined bit code words and generates a code data array.

In step S402, the error correction information adding unit 203 divides the code data array into a predetermined number of blocks according to an error correction method such as a Reed-Solomon code, generates an error correction code word for each block and adds the error correction code word after the code data array.

In step S403, the code information control unit 201 determines whether code information is already included in the inputted print information. The code information can be detected by analyzing a statistical characteristic or a frequency characteristic of the print image.

In a case of first attaching, that is, when the code information is not included in the print information (NO in step S403), the processing proceeds to step S404. If it is recognized in advance that the attaching is the first one, the processing can skip step S403 and directly proceeds to step S404.

In step S404, the code information generation unit 204 arranges a basic component of the code information to attach the code information.

Generally, the code information includes not only the code words but also includes the basic component to determine whether the code information exists, and determine the size and the grid of the code information. In the first attaching, the code information is not included in the print information. Accordingly, to form the code information, the basic components of the code information are arranged.

To embed the code information, generally, a virtual grid is disposed on a print image. The information is embedded according to existence or non-existence of the code information minimum component (actual visual minimum component such as a black dot or a black square) on the grid. In order to dispose the grid, for example, the code information minimum components for the grid are arranged that explicitly indicate the grid. Alternatively, code information minimum components are arranged such that a statistic characteristic or a frequency characteristic can be used. In the present exemplary embodiment, any method can be employed to dispose the grid.

Moreover, a header part indicating whether a mask pattern is used can be provided as the basic component. The header part will be described below. If a set of mask patterns to be used has not been determined as a system, set information of a mask pattern to be used is arranged in the code information as the basic component.

In step S405, the code information generation unit 204 arranges the code information in two-dimensions. In this step, the code information includes minimum components, and is arranged on the grid. However, the embedding information is not arranged on all of the locations where the code information minimum component can be arranged, but arranged only on locations where the mask pattern allows the embedding information to be provided.

Figure 5:
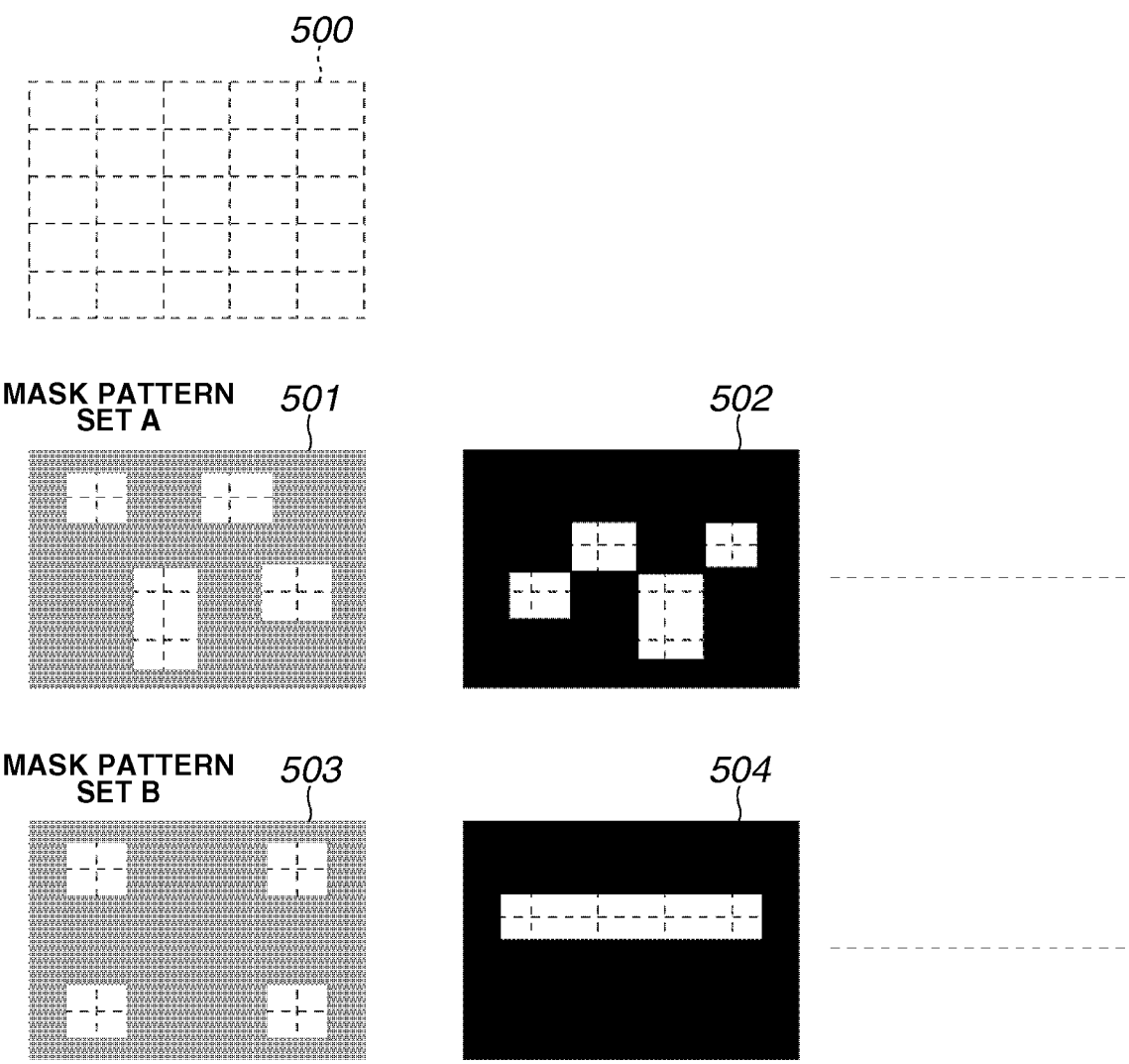
FIG. 5 is a view illustrating an example mask pattern according to the first exemplary embodiment of the present invention.

Examples of the mask patterns are illustrated in FIG. 5. A mask pattern target area 500 indicates a virtual grid, and arranged dots on the grid represent embedded information. Each of mask patterns 501 to 504 indicates locations where the code information minimum component can be attached, as white areas. The mask patterns are a set of a plurality of types, and locations where the code information minimum components can be attached, do not overlap with each other.

For example, in a case where a mask pattern set A is used, in the first attaching, the mask pattern 501 is used, and code word modules are arranged only on locations allowed by the mask pattern 501. In attaching for the N-th time, a mask pattern N (not illustrated) is used, and the code word modules are arranged only on locations allowed by the mask pattern N. Accordingly, it is actually possible to additionally attach the code information. As illustrated in FIG. 5, in a case where the mask patterns are regular patterns or irregular patterns from which human eyes can recognize no regularity, if the locations where the code information minimum components can be attached, do not overlap with each other within the mask pattern set, any mask pattern set can be used. The mask patterns do not allow the attaching of the code information minimum component on locations where dummy data for representing the basic component of the code information or the grid exists. The number of the mask patterns represent the number of times that the additional code information can be attached. As the number of the instance of attaching of code information is increased, the information amount per pattern is decreased. Accordingly, an appropriate mask pattern set is selected in consideration of the processing purpose.

In step S406, the mask pattern storage unit 205 stores information about the used mask pattern. In step S404, if the header part is provided, the code information generation unit 204 writes the information about the used mask pattern in the header part. By preparing the header part, when the code information is attached in the subsequent steps, the used mask pattern can be recognized quickly and accurately. The header part needs to be configured to represent the newly used mask patterns by adding the minimum component of the code information. For example, a predetermined area is associated with mask patterns. If the minimum component of the code information exists in the predetermined area, it can be determined that the mask pattern associated with the area has been used. However, even if the header part is not used, it is possible to find mask patterns that have been used by applying all mask pattern sets to detect whether the minimum component is attached. Accordingly, the header part is not necessarily required.

Figure 14A:
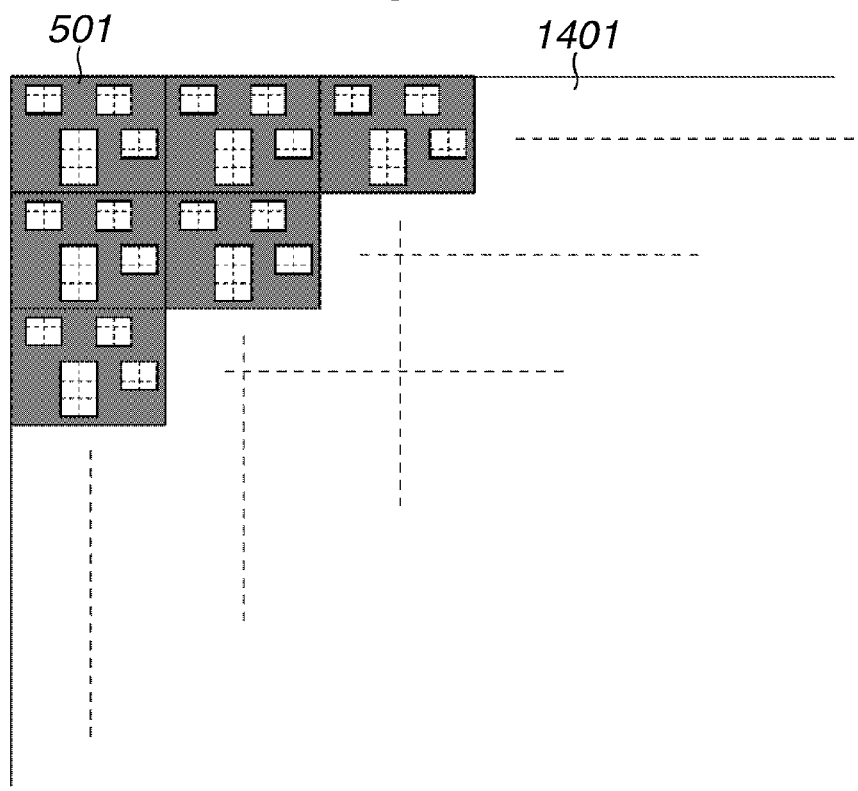
FIGS. 14A and 14B are views illustrating mask patterns superimposed on an image according to the first exemplary embodiment of the present invention.

FIG. 14A illustrates mask patterns superimposed on an image in the case where the header part is not used. The mask patterns 501 are regularly superimposed on an image 1401.

FIGS. 6A to 6D illustrate processing performed in steps S405 and S406 in the first code information generation.

Figure 6A:
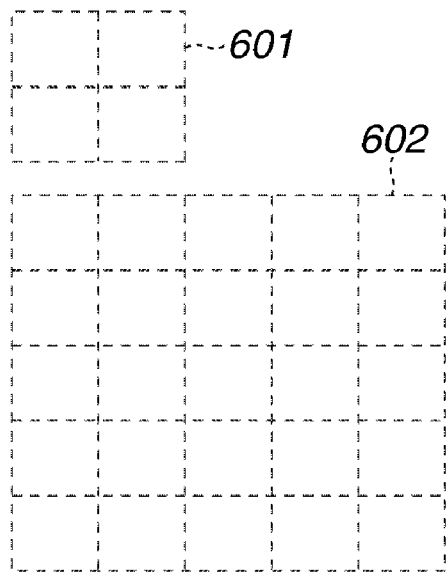
FIGS. 6A to 6D are views illustrating a first code information attaching according to the first exemplary embodiment of the present invention.

FIG. 6A illustrates an initial condition in step S405. Reference numeral 601 denotes the header part and reference numeral 602 denotes a data part. In the processing performed up to step S404, grids are virtually disposed. The grids are expressed by dotted lines. However, the dotted lines are drawn only for convenience and not actually drawn. While, in the exemplary embodiment, a method of defining the grids is not illustrated in the drawing, the grids can be defined according to various methods described in step S404.

Figure 6B:
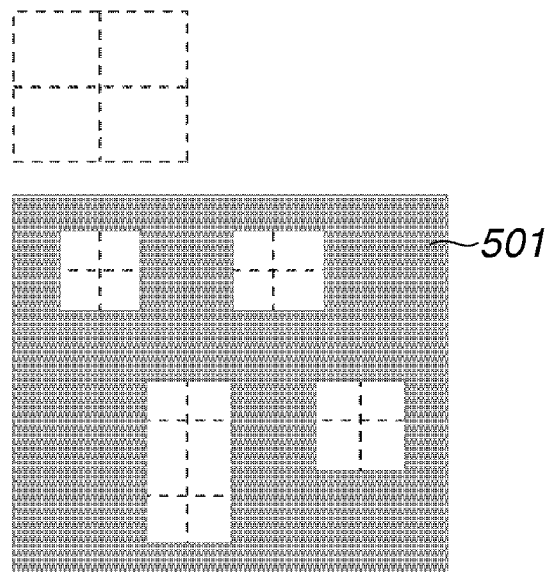

In FIG. 6B, the data part 602 is masked by the mask pattern 501 that is used in the first attaching. In the data part 602, a code information minimum component can be attached only on locations allowed by the mask pattern.

Figure 6C:
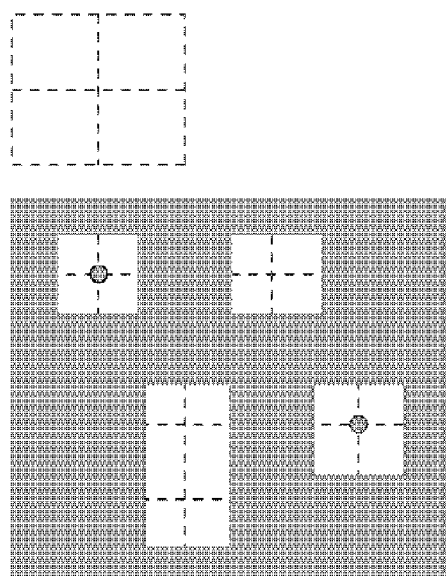

In FIG. 6C, the code information is attached only on the locations allowed by the mask pattern in the form of the code information minimum component. In the present exemplary embodiment, the information is embedded according to the existence and non-existence of the code information minimum component. However, the embedding information can also be represented by a direction of the code information minimum component, a type of the code information minimum component or any other methods.

Figure 6D:
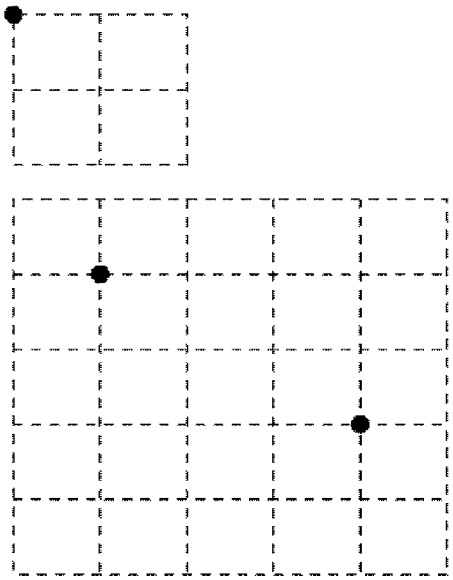

In FIG. 6D, by attaching a minimum component of the header part, the use of the mask pattern 501 is represented. In the present exemplary embodiment, the existence of the minimum component on an upper left grid in the header part 601 represents that the mask pattern 501 is used.

Figure 14B:
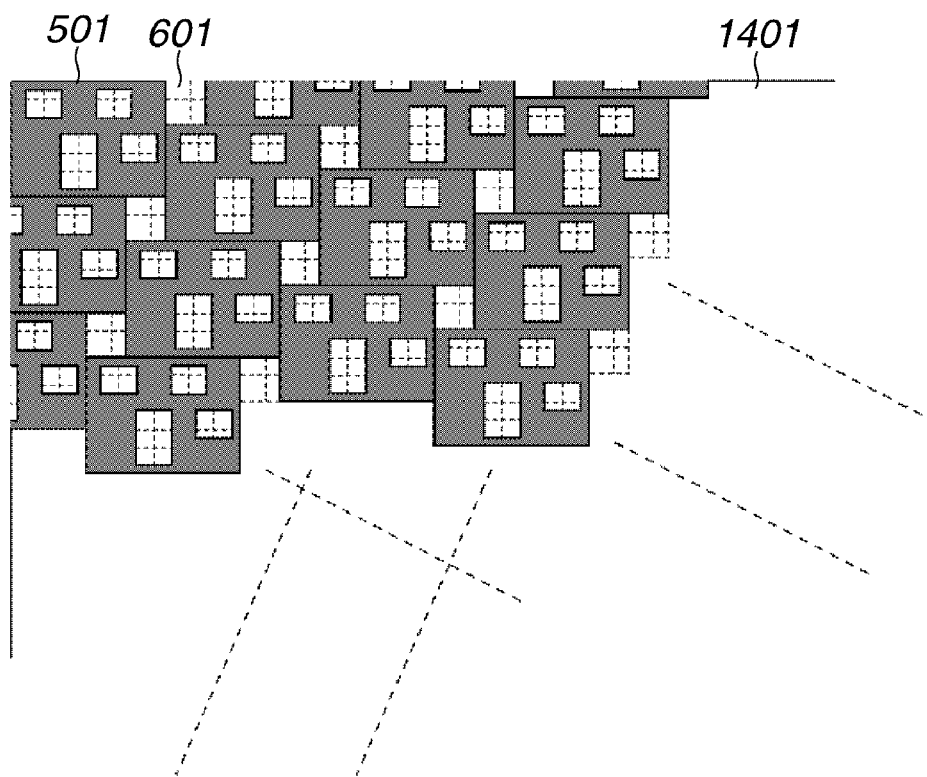

FIG. 14A illustrates mask patterns superimposed on an image in a case where the header part is not used. The mask patterns 501 are regularly superimposed on the image 1401. FIG. 14B illustrates mask patterns and their headers are superimposed on an image in a case where the header is used. The header part 601 is arranged on the upper right of the mask pattern 501. However, the header part 601 can be arranged also on the other parts. Further, it is not necessary that the number of the header parts 601 is the same as the number of superimposed mask patterns.

On the other hand, in step S403, if the code information is included in the print information (YES in step S403), that is, in a case of a code attaching a second or subsequent time after the first attaching, the process proceeds to step S407.

In step S407, the code information control unit 201 detects the virtual grid of the code information and mask patterns that have been already used. The mask pattern set to be used can be determined as a system in advance. Alternatively, the mask pattern set to be used can be obtained by arranging information about the used mask pattern set in the code information as a basic component and by decoding that part.

The method of detecting the virtual grid of the code information differs depending on the code information. For example, if a code information minimum component for a grid that explicitly indicates the grid is arranged, the grid detection is performed based on that information. As another example, the detection can be performed based on a statistical characteristic or a frequency characteristic of the code information. In the present exemplary embodiment, the method of detecting the virtual grid of the code information is not specifically defined.

Then, the mask pattern that has been already used is detected. If the header part that represents the mask pattern used for the code information is provided, the mask pattern that has been already used can be detected from the header part. If the header part is not provided, the mask pattern that has been already used can be detected by applying all mask patterns and checking whether the minimum component is attached. If an order of the mask patterns to be used is determined in advance, it is not necessary to apply all of the mask patterns unless all of the mask patterns have been already used. In that case, the mask patterns are applied in order and the existence or non-existence of the minimum component can be detected.

In step S408, the code information control part 201 determines whether additional information can be attached on the code information based on the mask pattern usage detected in step S407. That is, the attaching of the additional information is possible unless all of the mask patterns in the mask pattern set have been used, and the attaching of the additional information is not possible if all of the mask patterns have been used. If the attaching of the additional information is possible, a mask pattern to be used for the additional attaching is determined. If an order of the mask patterns to be used is determined, among unused mask patterns, a mask pattern to be used first is defined as a N-th mask pattern for the additional attaching. If the order of the mask patterns to be used is not determined, any unused mask pattern can be defined as the N-th mask pattern for the additional attaching.

If the additional attaching is possible (Yes in step S408), the processing proceeds to step S405. If the additional attaching is not possible (NO in step S408), the processing proceeds to step S409. In step S405, the code information generating unit 204 arranges the code information in two dimensions. In this case, the code information is arranged only where the mask pattern allows.

In step S406, if the header part is provided, information about which mask pattern is used, is represented in the header part.

In step S409, the code information generation unit 204 performs error processing. If the information to be attached to the print information as the code information is security information, print processing is not performed and the print flow of the code information is ended.

If the code information to be attached to the print information is not security information, the print processing is performed. It is possible to perform display indicating that the additional attaching cannot be performed, on a UI panel of the printing apparatus or in a client terminal of the user if necessary. Further, the user or the administrator of the printing apparatus can apply settings in advance to determine the processing of security information.

FIGS. 7A to 7D illustrate processing performed in the above described steps S407, S408, S405, and S406.

Figure 7A:
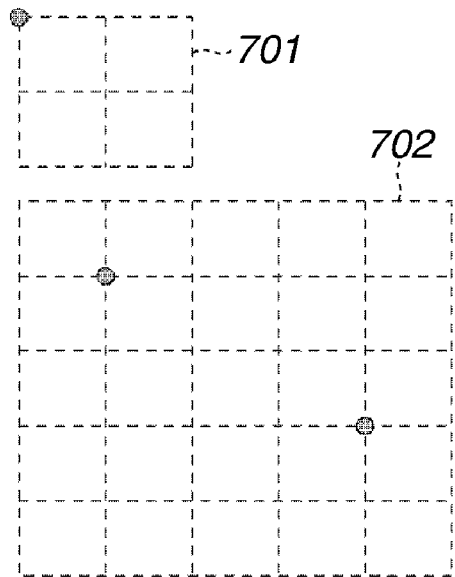
FIGS. 7A to 7D are views illustrating a second code information attaching according to the first exemplary embodiment of the present invention.

FIG. 7A illustrates the code information when the virtual grid is detected in step S407.

Figure 7B:
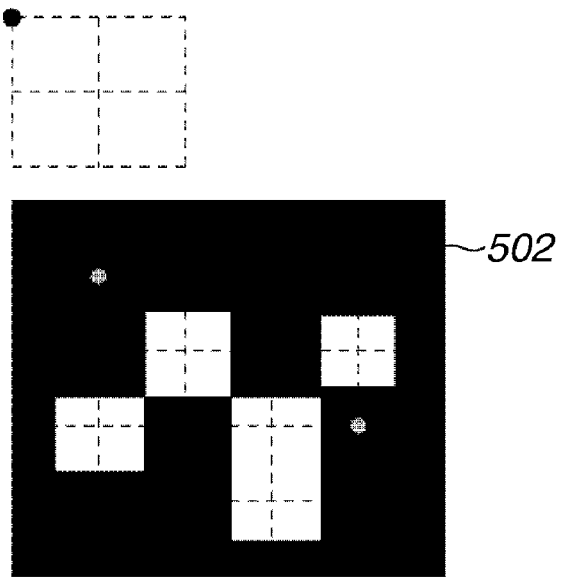

The code information generation unit 204 detects from a header part 701 that the mask pattern 501 has been used. As a result, it is determined that at the time of the first code information attaching, the mask pattern 501 was used. Accordingly, a mask pattern other than the mask pattern 501 is used this time. FIG. 7B illustrates that a data part is masked with a mask pattern 502. In a data part 702, the code information minimum component can be attached only on locations which are not covered by the mask pattern.

Figure 7C:
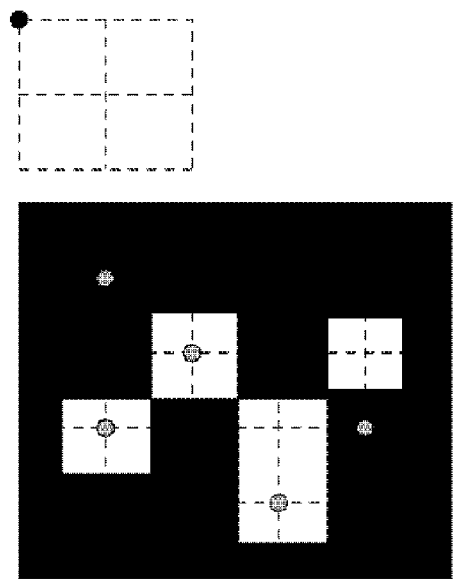
Figure 7D:
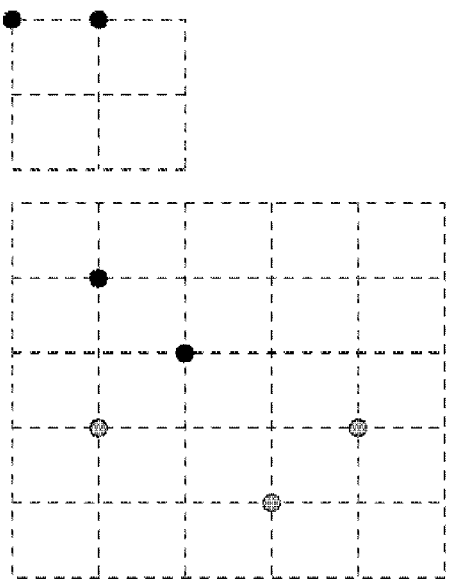

Then, code information is attached only on the locations which are allowed by the mask pattern in the form of the code information minimum component (FIG. 7C). By attaching the minimum component in the header part 701, it is shown that the mask pattern 502 has been used (FIG. 7D).

In the present exemplary embodiment, the minimum component is present at a second grid from the left at the top of the header part, which shows that the mask pattern 502 has been used.

Figure 8:
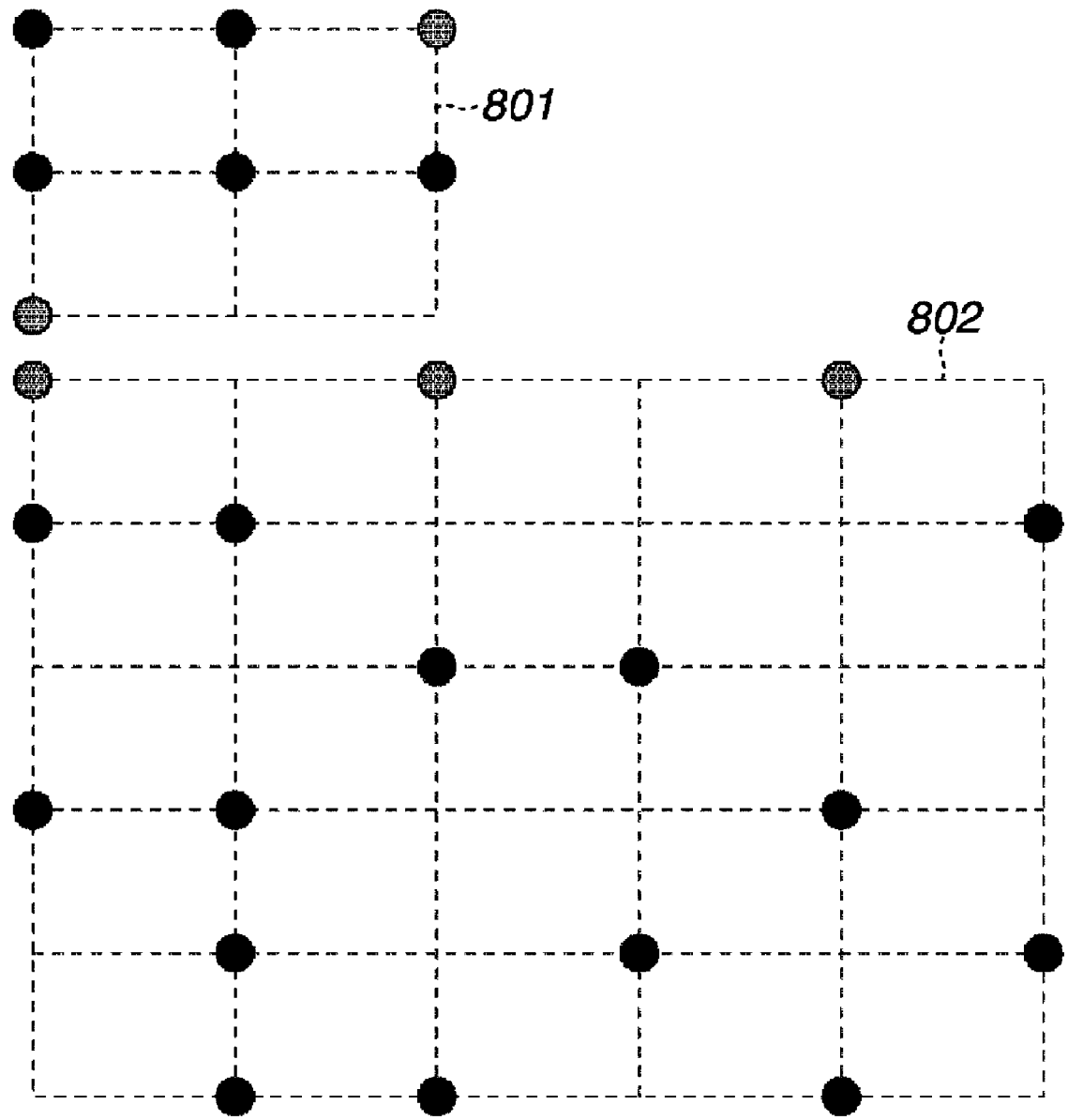
FIG. 8 is a view illustrating a result of a final code information attaching according to the first exemplary embodiment of the present invention.

FIG. 8 illustrates a header part 801 and a data part 802 of the code information after the attachings are performed four times. The header part 801 in FIG. 8 shows that five mask patterns have been used and the code information is attached to the data part 802. As described above, if the setting of the mask pattern set and the application of the mask patterns are appropriately performed in order, it is possible to increase the density of the code information which is natural to human eyes, without generating unnatural blank spaces in the code information.

Now, a code information extraction function according to the present exemplary embodiment will be described with reference to FIGS. 9 and 10.

Figure 9:
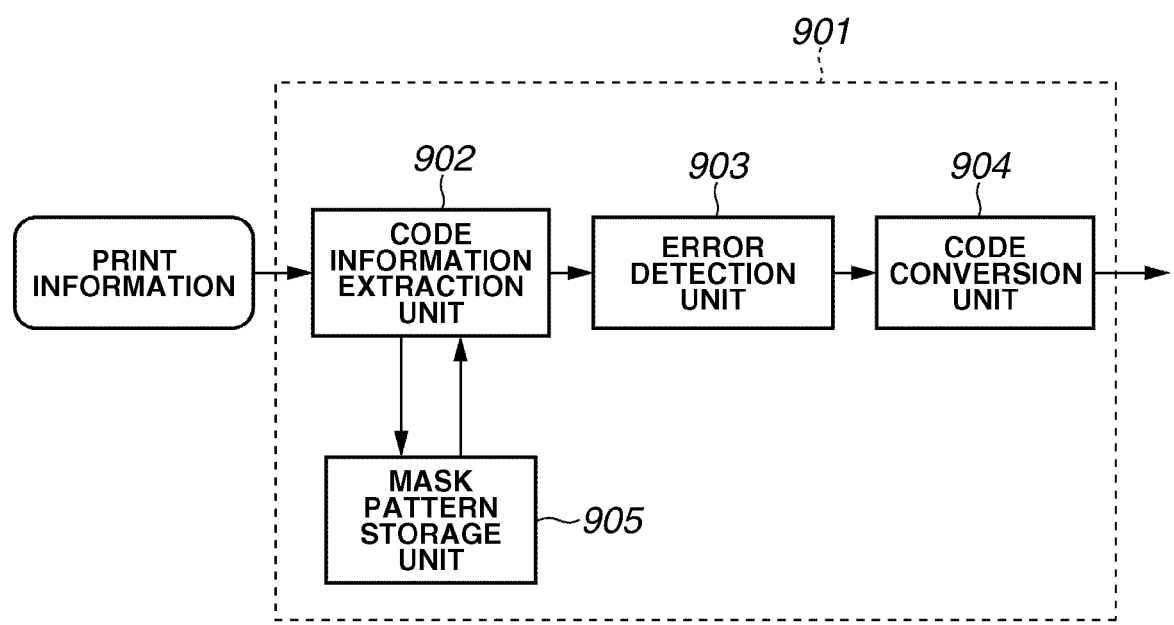
FIG. 9 is a block diagram illustrating a code information extraction function according to the first exemplary embodiment of the present invention.

FIG. 9 is a block diagram illustrating a configuration of the code information extraction function according to the present exemplary embodiment.

An embedded information extraction unit 901 extracts embedded information. A code information extraction unit 902 extracts code information from an inputted print image. An error detection unit 903 detects an error in the code information extracted in the code information extraction unit 902. A code conversion unit 904 converts the code information input from the error detection unit 903 into embedded information. A mask pattern storage unit 905 stores a mask pattern that indicates a location on paper where the code information is arranged.

Figure 10:
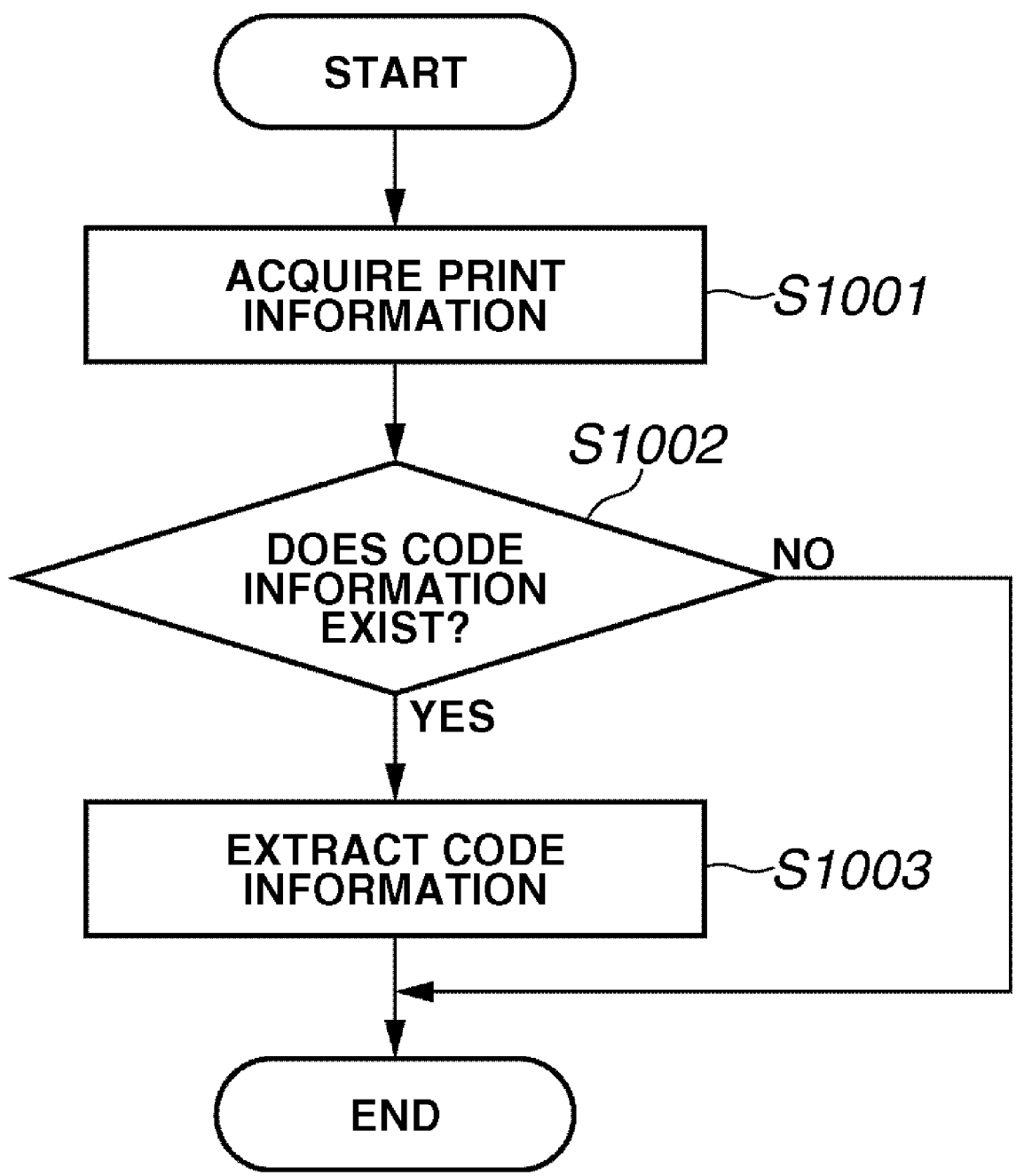
FIG. 10 is a flowchart illustrating the code information extraction function according to the first exemplary embodiment of the present invention.

With reference to FIG. 10, a processing flow of the code information extraction function according to the present exemplary embodiment will be described.

In step S1001, the embedded information extraction unit 901 acquires print information. The print information is acquired by scanning an image using the image input unit 100 such as a scanner or receiving print data transmitted from an external host computer, external facsimile or network via the transmission/reception unit 104.

In step S1002, the embedded information extraction unit 901 determines whether the code information is included in the inputted print information.

If the code information is included in the print information (YES in step S1002), the processing proceeds to step S1003. If the code information is not included in the print information (NO in step S1002), the processing is ended.

In step S1003, the embedded information extraction unit 901 extracts the code information.

Figure 11:
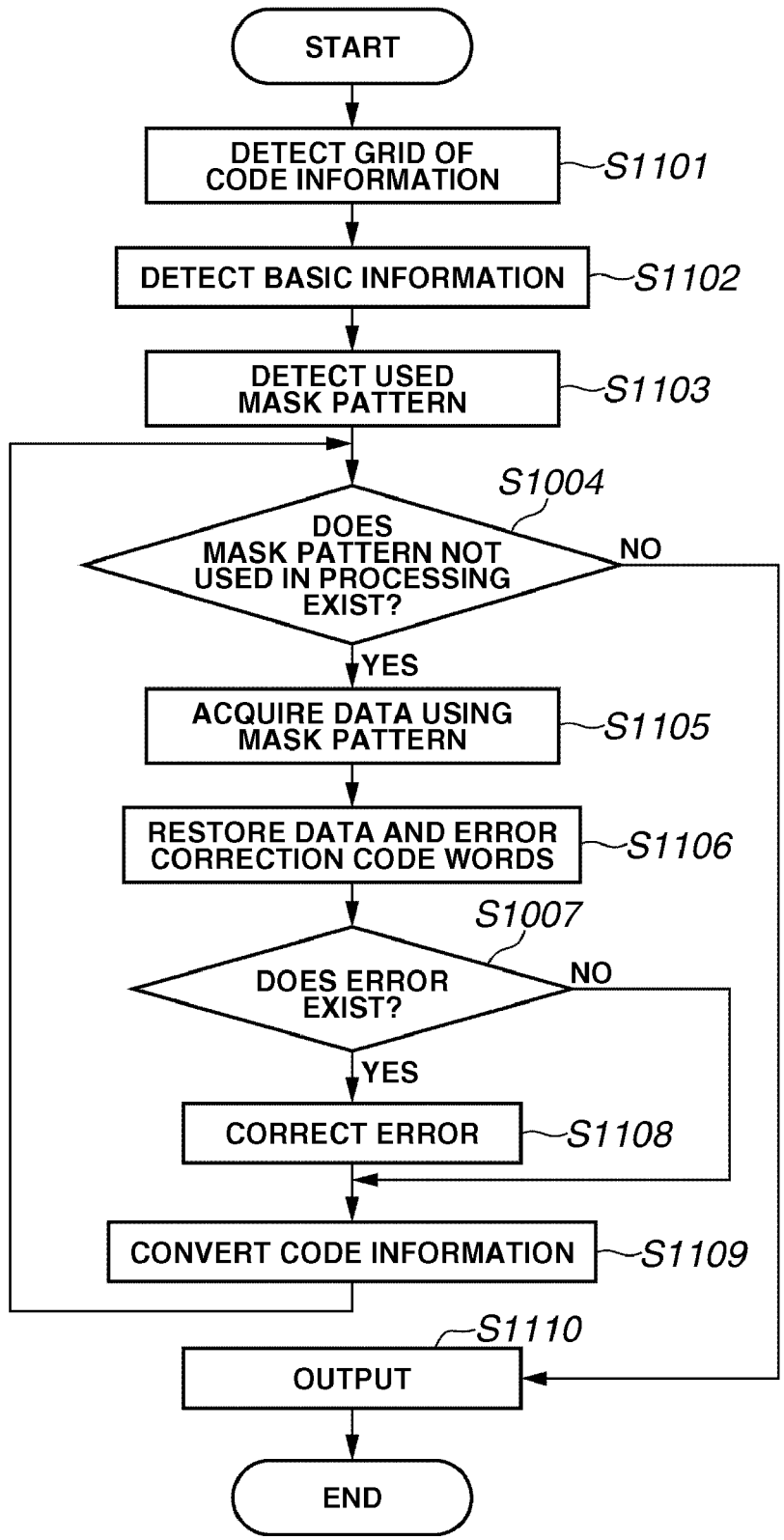
FIG. 11 is a flowchart illustrating the code information extraction function in detail according to the first exemplary embodiment of the present invention.

FIG. 11 is a flowchart illustrating the embedded information extraction processing performed in the embedded information extraction unit 901.

In step S1101, the code information extraction unit 902 detects a virtual grid of the code information. The method of detecting the virtual grid of the code information is not particularly specified.

In step S1102, the code information extraction unit 902 detects basic information including used mask pattern information from the input print image. If the mask pattern set to be used is not determined as a system, since use mask pattern set information is arranged in the code information as a basic component, that part is detected and the mask pattern set to be used can be obtained.

In step S1103, the code information extraction unit 902 detects a mask pattern that has been already used, from the basic information. If a header part that represents the used mask pattern for the code information is provided, the used mask pattern can be detected from the header part. If the header part is not provided, the mask pattern that has been already used can be detected by applying all mask patterns and detecting existence or non-existence of the minimum component. If an order of the mask pattern use is determined in advance, it is not necessary to apply all of the mask patterns unless all of the mask patterns have been already used. In that case, the mask patterns are applied in order and the existence or non-existence of the minimum component can be detected.

In step S1103, the code information extraction unit 902 determines whether a mask pattern which has not been used in the processing, exists among the used mask patterns which are detected in step S1103. If a mask pattern which has not been used in the processing exists (YES in step S1004), the processing proceeds to step S1105. If a mask pattern that has not been used in the processing does not exist (NO in step S1004), the processing proceeds to step S1110.

In step S1105, the code information extraction unit 902 extracts the code information using the mask pattern determined in step S1104 not to have been used. Then, the code information extraction unit 902 applies the mask pattern to the code information and extracts the code information only from locations allowed by the mask pattern.

In step S1106, the code information extraction unit 902 rearranges the code information extracted in the step S1105 according to an arrangement rule of the code information to obtain meaningful data. As a result, the original data and the error correction code word which are included in the part of the mask pattern used in step S1103, are restored.

In step S1107, the error detection unit 903 detects whether the extracted code information includes an error, using the error correction code word. If the error is included (YES in step S1007), the processing proceeds to step S1108. If the error is not included (NO in step S1007), the processing proceeds to step S1109.

In step S1108, the error detection unit 903 performs error correction of the extracted code information using the error correction code word.

In step S1109, the code conversion unit 904 converts the extracted code information and extracts the embedded information.

According to the above-described processing, it is possible to extract the embedded information from the code information using all the mask patterns used in the code information. The user or the administrator can appropriately convert the extracted embedded information into a form that can be readily handled, and display the information on a UI of the printing apparatus, a user terminal or an administrator's terminal. Alternatively, the user or the administrator can appropriately convert the extracted embedded information into a form that can be readily handled and transmit the data to the user terminal or the administrator's terminal.

Figure 12A:
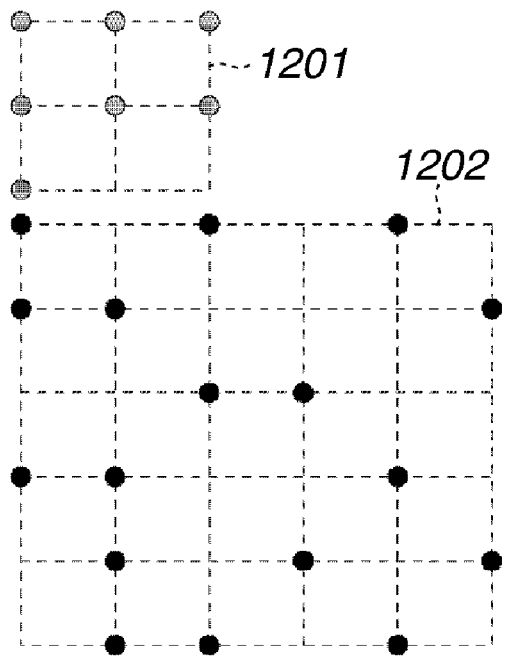
FIGS. 12A to 12C are views illustrating a first code information extraction according to the first exemplary embodiment of the present invention.
Figure 12B:
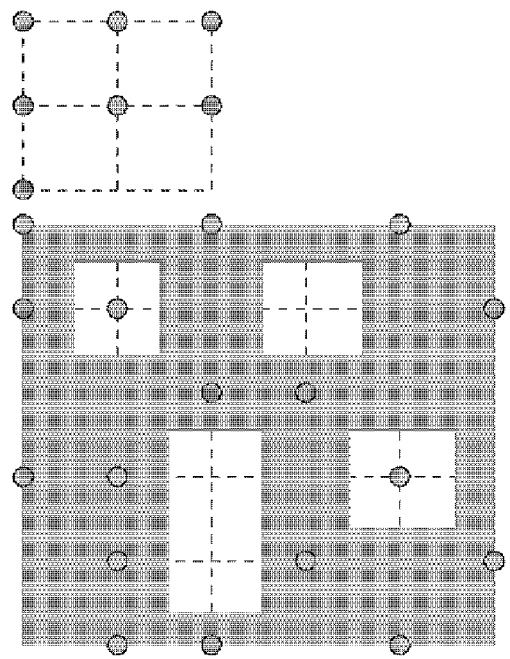
Figure 12C:
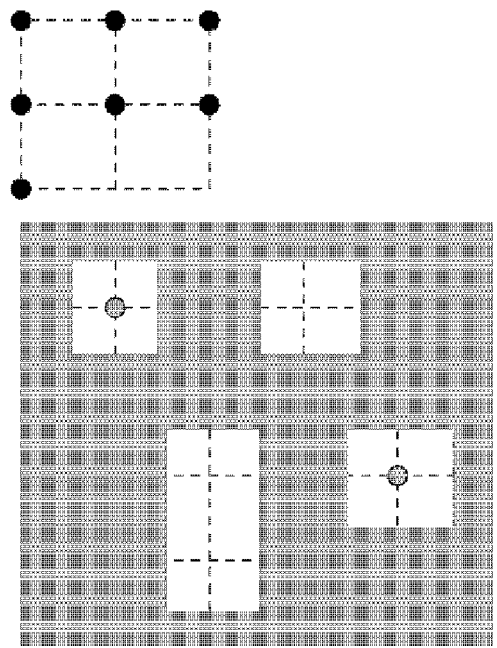

FIGS. 12A to 12C illustrate code information extraction performed by the code information extraction function. In FIG. 12A, reference numeral 1201 denotes a header part of code information in an extraction target print image, and reference numeral 1202 denotes a data part. In the drawing, grids are expressed by dotted lines. However, the dotted lines are drawn only for convenience, and not actually drawn. FIG. 12B illustrates a mask pattern applied to the data part 1202 in FIG. 12A. FIG. 12C illustrates code information extracted only from locations allowed by the mask pattern in the data part 1202 where the mask pattern is applied.

Accordingly, correct embedded information can be extracted from the code information attached in a form natural to human eyes.

As described above, in the present exemplary embodiment, it is possible to attach code information over paper without providing in advance a space for attaching the code information and read the embedded information.

Second Exemplary Embodiment

In the first exemplary embodiment, the present invention is applied to the printing apparatus such as the multifunction peripheral (MFP). However, the present invention can also be applied to a system that includes a plurality of devices, for example, a host computer, an interface device, a scanner and a printer.

Figure 13:
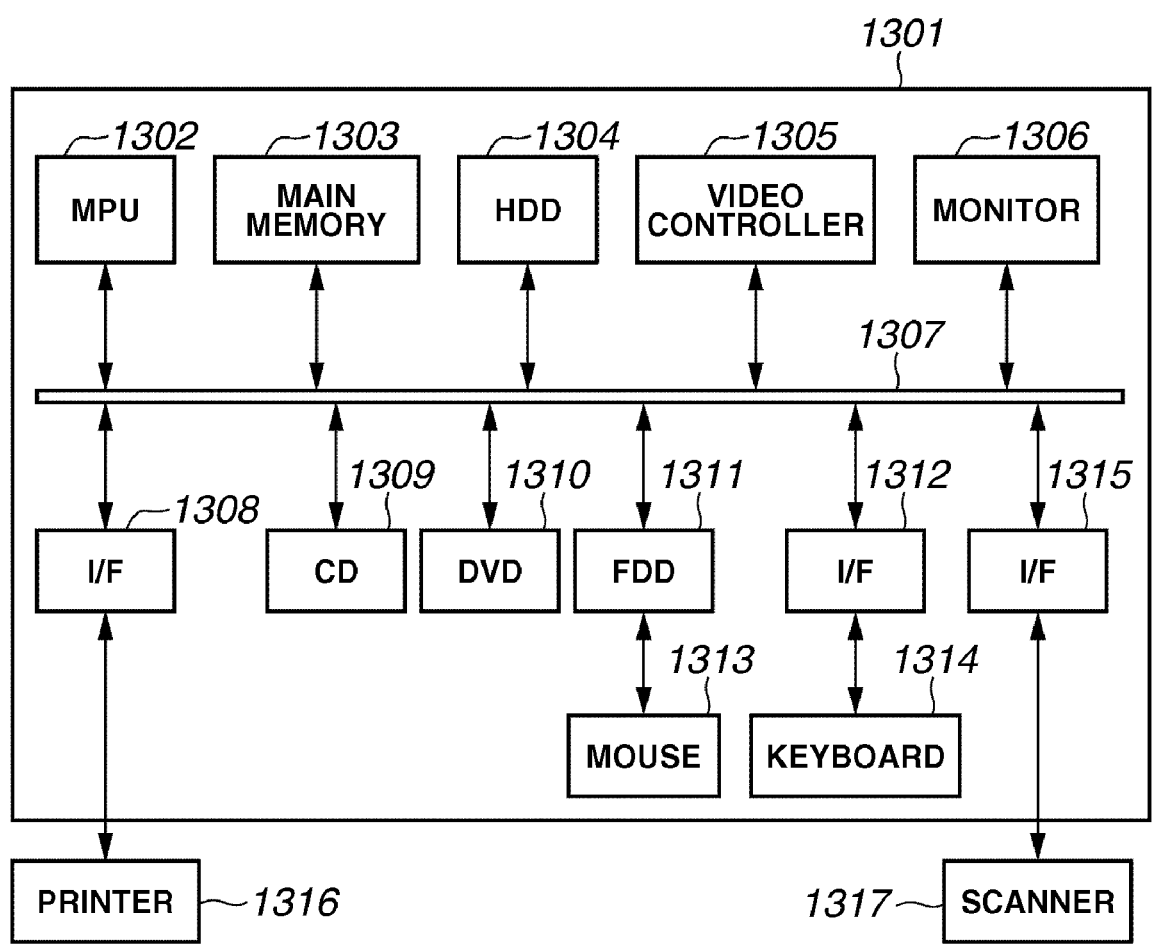
FIG. 13 is a view illustrating an image processing apparatus and a printing apparatus which performs a code information attaching function according to a second exemplary embodiment of the present invention.

FIG. 13 illustrates a configuration of an image processing system according to a second exemplary embodiment. It is noted that in implementing an image processing apparatus, it is not necessary to use all functions illustrated in FIG. 13.

In FIG. 13, a computer 1301 is a prevalent personal computer. An image read by an image input device 1317 such as a scanner can be input to the computer 1301 and the computer 1301 can edit or store the input image. Moreover, the computer 1301 can cause a printer 1316 to print the image obtained by the image input device 1317. The user can input instructions by operating a mouse 1313 or a keyboard 1314.

In the inside of the computer 1301, each block which will be described below, is connected via a bus 1307 and various data can be transmitted and received among them. With reference to FIG. 13, a micro processing unit (MPU) 1302 controls operation of the blocks in the computer 1301 or executes a program stored in the computer 1301. A main memory unit 1303 temporarily stores programs and image data for processing performed in the MPU 1302. A hard disk (HDD) 1304 stores in advance programs and image data to be transferred to the main memory unit 1303 or the like and stores processed image data.

A scanner I/F 1315 is connected to a scanner 1317 and inputs the image data obtained by the scanner 1317. The scanner 1317 reads a document, a film or the like and generates image data. A printer I/F 1308 is connected to a printer 1316 that prints the image data and transmits the image data to the printer 1316.

A compact disc (CD) drive 1309 reads data stored in a CD (CD-recordable/CD-rewritable) (i.e., one of external storage media) or writes data to a CD. A Floppy® disk drive (FDD) 1311 reads data from a FDD or writes data to the FDD, similar to the CD drive 1309. A digital versatile disc (DVD) drive 1310 reads data from a DVD or writes data to the DVD, similar to the FDD drive 1311. If a program for editing images or a printer driver is stored in a CD, FDD or a DVD, the program or the printer driver can be installed in the HDD 1304 and the installed data is transferred to the main memory unit 1303 if necessary.

An I/F 1312 is connected to the mouse 1313 or the keyboard 1314 to receive an input instruction from the mouse 1313 or the keyboard 1314. A monitor 1306 displays a result or a process of extraction processing of watermark information. A video controller 1305 transmits display data to the monitor 1306.

With respect to a relationship between the image processing apparatus in FIG. 1 and the image processing system in FIG. 13, the image input unit 100 corresponds to the scanner 1317 and the environment setting unit 101 corresponds to the monitor 1306. The data processing unit 102 corresponds to the main memory unit 1303 and the MPU 1302, and the internal storage area unit 103 corresponds to the HDD 1304. The image transmission/reception unit 104 corresponds to the I/F 1308 or the I/F 1315, and the image output unit 105 corresponds to the printer 1316.

Other Exemplary Embodiment

In the first exemplary embodiment, if the header part is provided, in addition to the information about the used mask patterns, information indicating how many times mask patterns have been used for additional attaching can be represented in the header part. For example, if a mask pattern for second additional attaching is expressed as "1", it is represented as "2-1". Then, information indicating "2-1" can be represented in the header part.

As described above, not only the information about the used mask pattern can be represented in the header part; the information indicating how many times the mask patterns have been used for additional attaching can be represented in the header part. Accordingly, when data is decoded, it is possible to know how many times additional attaching has been performed until the decoding of the data. This information can increase convenience in applying the present invention to security use.

An aspect of the present invention can be applied, for example, to a system, an apparatus, a method, a program, or a storage medium. More specifically, an aspect of the present invention can be applied to a system including a plurality of devices or an apparatus consisting of a single device.

Further, a program of software implementing the functions of the above-described exemplary embodiment can be directly or remotely provided to a system or an apparatus. Then, a computer in the system or the apparatus achieves an aspect of the present invention by reading and executing the provided program code.

Accordingly, the program code itself installed on the computer to implement the functional processing of an aspect of the present invention, implements the functions of the present invention. That is, the computer program itself for implementing the functional processing of the present invention constitutes the present invention.

In such a case, if the function of the program is included, any style can be employed as the program, for example, a program implemented with an object code or an interpreter and script data to be supplied to an operating system (OS) can be employed.

As the recording medium for supplying such program code, for example, a Floppy® disk, a hard disk, an optical disk, and a magneto-optical disk can be employed. Further, a magneto-optical disk (MO), a compact disk read-only memory (CD-ROM), a CD-recordable (CD-R), a CD-rewritable (CD-RW), a magnetic tape, a nonvolatile memory card, a ROM, and a digital versatile disk-read only memory (DVD-ROM), a DVD-recordable (DVD-R) and a DVD-rewritable (DVD-RW) can be employed.

In addition, the program can be supplied by connecting to a home page of the Internet using a browser of a client computer. Then, the program is supplied from the home page by downloading the computer program itself of the present invention or a compressed file including an automatic installation function into a recording medium such as a hard disk and the like.

Further, the program code constituting the program according to the present invention can be divided into a plurality of files and each file can be downloaded from different home pages. That is, a world wide web (WWW) server which allows a plurality of users to download the program file for realizing the function processing of the present invention with the computer, is also included in the present invention.

Further, the program according to the present invention can be encrypted and stored on a storage medium such as a CD-ROM, and distributed to the users. A user who has cleared prescribed conditions is allowed to download key information for decrypting the cipher from a home page through the Internet. The user executes the encrypted program using the key information and the program is installed on the computer. Thus, an aspect of the present invention can be realized.

Further, the function according to the embodiments described above can be implemented by executing the program code read by the computer. Furthermore, based on an instruction according to the program code, an OS and the like running on the computer executes a part or the whole of the actual processing and thus, the function of the above-described embodiments can be realized.

Moreover, in another aspect of an exemplary embodiment of the present invention, the program code read from the storage medium is written on a memory which is provided in a function enhancing board inserted in the computer or in a function enhancing unit connected to the computer. Then, based on an instruction according to the program code, a central processing unit (CPU) or the like provided in the function enhancing board or in the function enhancing unit executes a part or the whole of the actual processing and thus, the function of the above described embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-346196 filed on Dec. 22, 2006, which is hereby incorporated by reference herein in its entirety.

What is claimed is:

1. An image processing apparatus configured to generate code information represented by a dot array and attach the code information on an image, the image processing apparatus comprising:
 a determination unit configured to determine one mask pattern from among a plurality of mutually-different mask patterns of locations to attach the code information, wherein the locations do not overlap with each other; and
 an attaching unit configured to attach the code information on the image at a location corresponding to the mask pattern determined by the determination unit.

2. The image processing apparatus according to claim 1, wherein the attaching unit attaches the information indicating the pattern used in the determination unit, on the image.

3. An image processing apparatus according to claim 1, wherein the determination unit determines a pattern in which a location to attach the code information differs from that of the pattern already used to attach code information if code information already exists in the image to which the code information is to be attached.

4. An image processing apparatus according to claim 1, further comprising a storage unit configured to store the pattern and information indicating that the pattern has been used,
 wherein the determination unit determines a location to attach code information on the image, based on the pattern and the information stored in the storage unit which indicates that the pattern has been used.

5. A method of generating code information represented by a dot array and attaching the code information on an image, the method comprising:
 determining one mask pattern from among a plurality of mutually-different mask patterns of locations to attach the code information, wherein the locations do not overlap with each other; and
 attaching the code information on the image at the determined location.

6. An image processing apparatus comprising:
 an input unit configured to input an image to which code information represented by a dot array is attached based on a plurality of mutually-different mask patterns of locations to attach the code information, wherein the locations do not overlap with each other; and
 an extraction unit configured to extract the code information from the input image based on the mask patterns.

7. The image processing apparatus according to claim 6, further comprising a storage unit configured to store the patterns and information indicating that the patterns have been used,
 wherein the extraction unit extracts the code information based on the patterns and the information stored in the storage unit which indicates that the patterns have been used.

8. A computer-readable storage medium storing a computer-executable process, the computer-executable process causing a computer to perform a method comprising:
 inputting an image on which code information represented by a dot array is attached based on mutually-different mask patterns of locations to attach the code information, wherein the locations do not overlap with each other; and
 extracting the code information from the input image based on the mask patterns.

9. A method comprising:
 inputting an image on which code information represented by a dot array is attached based on mutually-different mask patterns of locations to attach the code information, wherein the locations do not overlap with each other; and
 extracting the code information from the input image based on the mask patterns.

10. A computer-readable storage medium storing a computer-executable process, the computer-executable process causing a computer to perform a method comprising:
 determining one mask pattern from among a plurality of mutually-different mask patterns of locations to attach the code information, wherein the locations do not overlap with each other; and
 attaching the code information on the determined location.

* * * * *